(12) United States Patent
Rosiewicz

(10) Patent No.: US 7,515,807 B2
(45) Date of Patent: Apr. 7, 2009

(54) HERMETIC FIBER FEEDTHROUGH

(75) Inventor: Alex Rosiewicz, Stow, MA (US)

(73) Assignee: EM4, Inc., Bedford, MA (US)

( * ) Notice: Subject to any disclaimer, the term of this patent is extended or adjusted under 35 U.S.C. 154(b) by 0 days.

(21) Appl. No.: 12/143,071

(22) Filed: Jun. 20, 2008

(65) Prior Publication Data
US 2008/0317427 A1    Dec. 25, 2008

Related U.S. Application Data

(60) Provisional application No. 60/945,796, filed on Jun. 22, 2007.

(51) Int. Cl.
*G02B 6/00* (2006.01)
*G02B 6/38* (2006.01)
(52) U.S. Cl. .............................. 385/138; 385/58; 385/74
(58) Field of Classification Search .................. 385/55, 385/58, 73, 74, 76, 94, 134, 138
See application file for complete search history.

(56) References Cited

U.S. PATENT DOCUMENTS

| 4,682,846 A | 7/1987 | Cowen |
| 4,690,487 A | 9/1987 | Hale et al. |
| 5,210,815 A * | 5/1993 | Alexander et al. .......... 385/138 |
| 5,325,456 A * | 6/1994 | Cullen et al. ................ 385/138 |
| 7,103,257 B2 * | 9/2006 | Donaldson et al. .......... 385/138 |
| 7,447,390 B2 * | 11/2008 | Dunphy et al. ................ 385/12 |

FOREIGN PATENT DOCUMENTS

| JP | 54042161 | 4/1979 |
| JP | 57078010 | 5/1982 |

OTHER PUBLICATIONS

International Search Report issued for PCT/US2008/067641, dated Dec. 22, 2008.

* cited by examiner

*Primary Examiner*—Sung H Pak
*Assistant Examiner*—Daniel Petkovsek
(74) *Attorney, Agent, or Firm*—Wilmer Cutler Pickering Hale & Dorr LLP

(57) ABSTRACT

A fiber optic feedthrough includes a housing defining a cylindrical bore, the housing fitting hermetically into an aperture of a wall. A first collimator sealed within the bore receives output from an optical fiber located on a first side of the wall, and a second collimator also sealed within the bore, optically aligned with the first collimator, receives the signal and provides it to a second optical fiber located on a second side of the wall. The polarization extinction ratio of an optical signal traveling through the feedthrough is maintained at a value of at least about 12 dB, and the hermeticity of the feedthrough across the wall is better than about $10^{-6}$ atm.cc.sec$^{-1}$.

25 Claims, 2 Drawing Sheets

HERMETIC FIBER FEEDTHROUGH

CROSS-REFERENCE TO RELATED APPLICATIONS

This application claims benefit of U.S. Provisional Patent Application Ser. No. 60/945,796, filed Jun. 22, 2007, which is incorporated herein by reference.

TECHNICAL FIELD

This application relates to a fiber optic connections, and more particularly to passing a fiber through a wall.

BACKGROUND

It is often necessary to pass an optical fiber through a wall, such as the wall of a vessel or package containing electronic components. When the wall separates two regions with significantly different pressure, such as an evacuated region or the inside of a vessel, from the atmosphere, the fiber needs to pass through the wall without allowing gas leakage. Traditional methods involve stripping off a portion of the fiber cladding in the region of the fiber that passes through the wall, filling in the stripped portion with an epoxy layer, and positioning and sealing the epoxy-coated portion in an aperture passing through the wall. In order to provide a good hermetic seal a tight mechanical attachment is usually required. But such a tight attachment tends to induce stress on the optical fiber, and this stress can degrade the quality of the fiber transmission through the wall. In particular, the stress can degrade the polarization extinction ratio (PER).

SUMMARY

The described embodiment features a fiber optic feedthrough that maintains high hermeticity and polarization extinction ratio.

In general in one aspect a fiber optic feedthrough includes: a housing defining a bore, the housing being adapted to fit hermetically into an aperture of a wall; a first collimator configured to receive an output from a first optical fiber located on a first side of the wall, the first collimator sealed within a portion of the bore adjacent to a first end of the bore; and a second collimator configured to provide an input to a second optical fiber located on a second side of the wall, the second collimator sealed within a portion of the bore adjacent to a second end of the bore, the second collimator being optically aligned with the first collimator. The polarization extinction ratio of an optical signal traveling from the first optical fiber through the first and second collimators to the second optical fiber is maintained at a value of at least 12 dB, and the hermeticity of the feedthrough across the wall is better than about $10^{-6}$ atm.cc.sec$^{-1}$.

The inventions may also feature one or more of the following. The first collimator and the second collimator each include a lens. The surface of the bore defines a cylinder. An angular offset between an axis defined by the first collimator and an axis defined by the second collimator is less than about one milliradian. The first and second collimators can be rotated about an axis parallel to an axis defined by the bore. The first collimator is rotationally aligned with the second collimator to within about one degree. The polarization extinction ratio is maintained at a value of at least 20 dB. The hermeticity of the feedthrough across the wall is better than about $10^{-7}$ atm.cc.sec$^{-1}$, and can be better than about $10^{-8}$ atm.cc.sec$^{-1}$.

In general, in another aspect, a vessel includes: a wall, the wall being capable of separating a first fluid having a first pressure and a second fluid having a second pressure, the first pressure being greater than the second pressure; a housing defining a hollow bore, the housing being adapted to fit hermetically into an aperture defined by the wall; a first collimator configured to receive an output from a first optical fiber located in the first volume, the first collimator sealed within a portion of the bore adjacent to a first end of the bore; and a second collimator configured to provide an input to a second optical fiber located in the second volume, the second collimator sealed within a portion of the bore adjacent to a second end of the bore, the second collimator being optically aligned with the first collimator, the housing and the first and second collimators comprising a fiber optic feedthrough, wherein a polarization extinction ratio of an optical signal traveling between the first volume and the second volume through the fiber optic feedthrough is maintained at a value of at least 12 dB. The vessel may be a spacecraft, and the wall may be capable of separating a volume of gas at a pressure of about one atmosphere from the vacuum of outer space. The vessel may be a submarine, and the fluid outside a wall of the submarine may be water. The vessel may be a pressure vessel for use in a chemical plant.

DETAILED DESCRIPTION

A method and apparatus described here for making a hermetic fiber feedthrough uses an expanded beam coupling. The fiber passes through a barrier, such as a wall, that divides a higher pressure side and a lower pressure side. The wall can be the wall of an evacuated vessel or package, or the wall of a spacecraft. In the case of a spacecraft, the wall divides regions of about 0 atm and 1 atm, although the feedthrough can be used in other contexts.

Figure 1:
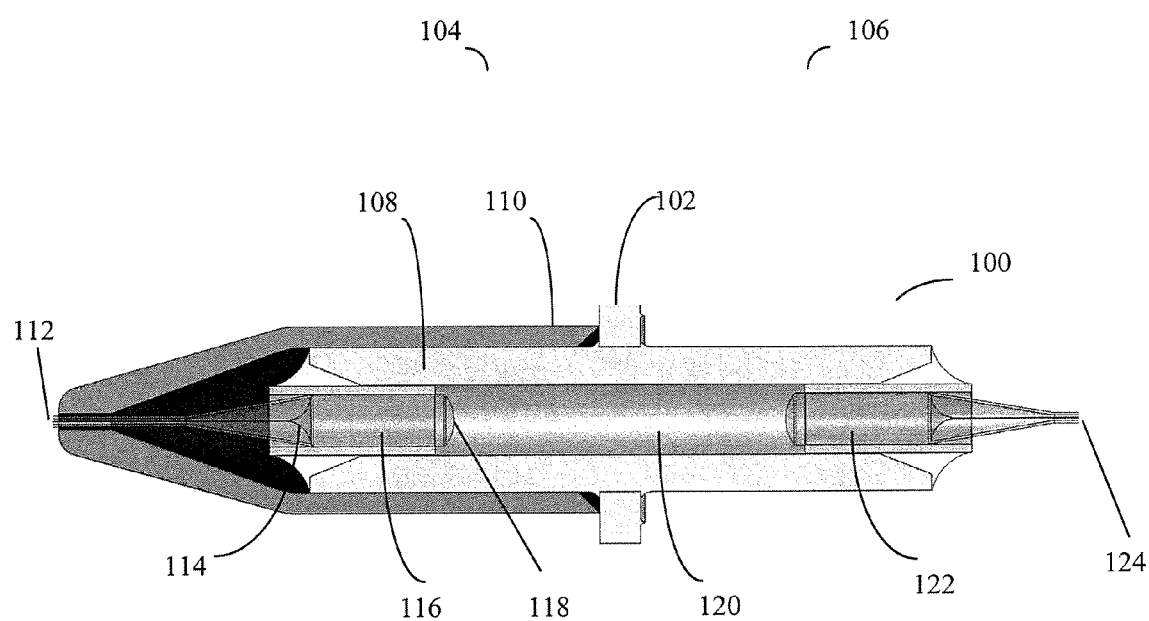
FIG. 1 is an illustration of a fiber optic feedthrough, according to the described embodiment.

FIG. 1 illustrates the described embodiment 100 of a fiber optic feedthrough embedded in an aperture of a wall 102 separating lower pressure region 104 from higher pressure region 106. Housing 108 of the feedthrough is made of a hard material, such as Kovar or stainless steel, and may be cylindrical, with an outer diameter that fits securely into a cylindrical aperture in wall 102, and a hollow bore that houses the optics. The outer surface of the housing may define a square, rectangular, or other cross section, and the hollow bore may be cylindrical or, alternatively, have a square, rectangular, or other cross section. On the low pressure side of the wall, housing 108 is enclosed in rubber boot 110 to protect protruding optical elements and to secure the incoming optical fiber. First fiber 112 enters feedthrough 100 through an aperture in rubber boot 110, and terminates at beam expander 114, which provides an output to first collimator 116. Collimator 116 includes lens 118, shown in the figure as a discrete lens aligned to the fiber in a tube. Alternatively, the lens may be fused to the fiber, using, for example, a Lightpath technique. In this technique a graded index lens is directly fused to the silica fiber to provide a high strength and low loss joint. The resulting assembly is then used as a single monolithic component. After passing through lens 118, the output from first fiber 112 passes through inner cylindrical region 120 of housing 110 to second collimator 122, which is substantially the same as first collimator 116. The diameter of inner cylindrical region 120 is about 3 mm, and is accurately machined so as to act as a mechanical boresight that aligns second collimator 122 with first collimator 116. The distance between the first and second collimators depends on the thickness of wall 102; in described embodiment 100, the distance between the first lens and the second lens is about 30 mm, and each collimator is about 10 mm long. Second collimator 122 provides output to second fiber 124, which exits feedthrough 100 in higher pressure region 106.

All the elements of described embodiment 100 are soldered in place so that none of the optical elements are exposed to ambient gas, such as, for example, the atmosphere. Such an arrangement can achieve hermeticity values of better than $10^{-6}$ atm.cc.sec$^{-1}$ and typically in a range of $10^{-6}$ to $10^{-9}$ atm.cc.sec$^{-1}$. In many practical situations it is desirable for the hermeticity to be at least as good as $10^{-7}$ atm.cc.sec$^{-1}$ or even $10^{-8}$ atm.cc.sec$^{-1}$, which the described embodiment can provide. Such situations include operation in the vacuum environment of space, where hermeticity levels of about $10^{-9}$ atm.cc.sec$^{-1}$ are required to maintain an acceptable gaseous atmosphere inside the enclosure for a period of at least about five years.

The outer diameter of the collimator and the inner diameter of the bore is manufactured to a tolerance of 10 microns or better to insure proper alignment of the collimators. In addition the collimator can be inserted far enough into the bore to assure that the angular offset is negligible. For example, with an insertion distance of 10 mm, an angular offset of about a milliradian can be achieved. Lateral offsets are negligible since the device is in collimated space, and the collimated, expanded beam is not sensitive to lateral displacements.

In most fiber applications, it is important to maintain the PER. As mentioned above, stress on a fiber degrades the PER. Using fiber optic feedthrough 100, this kind of PER degradation is almost completely obviated since at no point is a fiber subjected to significant stress. Thus feedthrough 100 maintains a PER of about 20 dB as the optical signal travels between a lower pressure region and a higher pressure region.

Feedthrough 100 also enables the collimators to rotate relative to each other, and in order maintain the polarization angle and PER of the optical signal, the collimators are rotationally aligned with each other to an accuracy of at least about 1 degree. This adjustment is significant because the fibers maintain polarization, i.e., the light emerging from a fiber is polarized at a well-defined polarization angle. Since a light-accepting fiber is also polarized at a well defined angle, the two fibers should be rotationally aligned to within about one degree or better, otherwise a portion of the polarized light from the emitting fiber is launched into the orthogonal axis of the receiving fiber, resulting in degradation of the PER.

A PER as low as 12 dB is acceptable for many applications, especially in cases where the principal concern is the total amount of power in the correct polarization state and the power in the other state is not detrimental to the application. At a PER of 12 dB, about 94% of the power is in the correct polarization state. An example is the combining of differently polarized beams to achieve higher pump powers. By contrast, in cases where light in the wrong polarization state induces system noise, for example in a communications system, then a PER of 20 dB or higher, corresponding to 1% or less of the power in the wrong state, is required. Such a PER is easily achieved with the described hermetic fiber feedthrough. For comparison, the PER supported by an unstressed fiber is about 30 dB.

Figure 2:
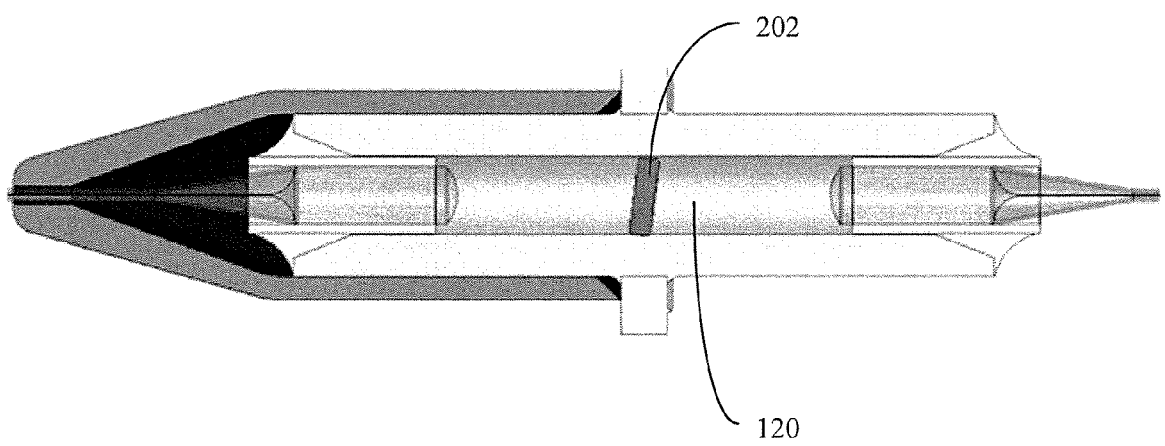
FIG. 2 is an illustration of a demountable fiber optic feedthrough.

A demountable feedthrough is achieved by inserting a hermetic window between the two collimators. This allows one or both collimators to be removed from the housing without allowing gas to pass from the higher pressure region into the lower pressure region. FIG. 2 illustrates a demountable feedthrough with window 202 hermetically fitted into bore 120. The window is tilted to prevent reflections from interfering with the beam. The window material includes sapphire, silica, or crown glass, such as Schott BK7. For applications in which the light is in the mid-infrared region (2-10 microns), the window material includes a zinc selenide, germanium, or chalcogenide glass.

In this way a simple, cost-effective, high transmission, high PER fiber feedthrough can be realized at minimal development cost. By comparison, designing and developing techniques to window strip a fiber and apply a highly hermetic seal without imposing sufficient stress to the fiber to degrade the polarization is a lengthy, iterative procedure.

One application involves using the described embodiment to pass a fiber through the wall of a spacecraft, where high hermeticity is required between the pressurized cabin inside the craft and the very low pressures of space. In another application, polarized fibers are passed through the walls of a pressure vessel in a marine environment, such as, for example, passing signals from sensors through the walls of a submarine. A further application is to pass polarization-maintaining fibers through the wall of a pressure vessel, such as used in a chemical plant, to extract data from distributed temperature and pressure sensors inside the vessel. The inside of the pressure vessel may be a gas or liquid at high pressure. The outer surface of the pressure vessel wall may be in contact with gas at a lower pressure, such as the atmosphere, or with a liquid within which the vessel is immersed. The pressures may be reversed, with the vessel containing a fluid at low pressure within a higher pressure fluid in contact with the outer wall of the vessel.

Other aspects, modifications, and embodiments are within the scope of the following claims.

The invention claimed is:

1. A fiber optic feedthrough for passing through an aperture in a wall, the fiber optic feedthrough comprising:
   a housing defining a bore, the housing fitting hermetically into the aperture in the wall;
   a first collimator configured to receive an output from a first optical fiber located on a first side of the wall, the first collimator sealed within a portion of the bore adjacent to a first end of the bore; and
   a second collimator configured to provide an input to a second optical fiber located on a second side of the wall, the second collimator sealed within a portion of the bore adjacent to a second end of the bore, the second collimator being optically aligned with the first collimator;
   wherein a polarization extinction ratio of an optical signal traveling from the first optical fiber through the first and second collimators to the second optical fiber is maintained at a value of at least 12 dB, and a hermeticity of the feedthrough across the wall is better than about $10^{-6}$ atm.cc.sec$^{-1}$.

2. The fiber optic feedthrough of claim 1, wherein the first collimator and the second collimator each include a lens.

3. The fiber optic feedthrough of claim 1, wherein an angular offset between an axis defined by the first collimator and an axis defined by the second collimator is less than about one milliradian.

4. The fiber optic feedthrough of claim 1, wherein the first and second collimators can be rotated about an axis parallel to an axis defined by the bore.

5. The fiber optic feedthrough of claim 1, wherein the first collimator is rotationally aligned with the second collimator to an accuracy of about one degree or better.

6. The fiber optic feedthrough of claim 1, wherein the polarization extinction ratio is maintained at a value of at least 20 dB.

7. The fiber optic feedthrough of claim 1, wherein the hermeticity of the feedthrough across the wall is better than about $10^{-7}$ atm.cc.sec$^{-1}$.

8. The fiber optic feedthrough of claim 1, wherein the hermeticity of the feedthrough across the wall is better than about $10^{-8}$ atm.cc.sec$^{-1}$.

9. A method of feeding an optical signal through a wall, the method comprising:
  providing a housing defining a bore, the housing fitting hermetically into an aperture defined by the wall;
  using a collimator to collimate an output received from a first optical fiber located on a first side of the wall, the first collimator sealed within a portion of the bore adjacent to a first end of the bore;
  receiving the collimated output from the first optical fiber using a second collimator; and
  inputting the received collimated output from the first optical fiber to a second optical fiber located on a second side of the wall, the second collimator sealed within a portion of the bore adjacent to a second end of the bore, the second collimator being optically aligned with the first collimator;
  wherein a polarization extinction ratio of the optical signal traveling from the first optical fiber through the first and second collimators to the second optical fiber is maintained at a value of at least 12 dB, and the method maintains a hermeticity of the wall at better than about $10^{-6}$ atm.cc.sec$^{-1}$.

10. The method of claim 9, wherein the first collimator and the second collimator each include a lens.

11. The method of claim 9, wherein an angular offset between an axis defined by the first collimator and an axis defined by the second collimator is less than about one milliradian.

12. The method of claim 9, wherein the first and second collimators can be rotated about an axis parallel to an axis defined by the bore.

13. The method of claim 9, wherein the first collimator is rotationally aligned with the second collimator to within about one degree.

14. The method of claim 9, wherein the polarization extinction ratio is maintained at a value of at least 20 dB.

15. The method of claim 9, wherein the hermeticity of the wall is better than about $10^{-7}$ atm.cc.sec$^{-1}$.

16. The method of claim 9, wherein the hermeticity of the wall is better than about $10^{-8}$ atm.cc.sec$^{-1}$.

17. An apparatus comprising:
  a housing defining a hollow bore, the housing fitting hermetically into an aperture defined by a wall;
  a first collimator configured to receive an output from a first optical fiber located on a first side of the wall, the first collimator sealed within a portion of the bore adjacent to a first end of the bore; and
  a second collimator configured to provide an input to a second optical fiber located on a second side of the wall, the second collimator sealed within a portion of the bore adjacent to a second end of the bore, the second collimator being optically aligned with the first collimator,
  the housing and the first and second collimators comprising a fiber optic feedthrough, wherein a polarization extinction ratio of an optical signal traveling through the fiber optic feedthrough is maintained at a value of at least 12 dB, and a hermeticity of the feedthrough across the wall is better than about $10^{-6}$ atm.cc.sec$^{-1}$.

18. An apparatus comprising:
  a vessel comprising a wall capable of separating a region of higher pressure gas from a region of lower pressure gas;
  a housing defining a bore, the housing fitting hermetically into an aperture defined by the wall;
  a first collimator configured to receive an output from a first optical fiber located on a first side of the wall, the first collimator sealed within a portion of the bore adjacent to a first end of the bore; and
  a second collimator configured to provide an input to a second optical fiber located on a second side of the wall, the second collimator sealed within a portion of the bore adjacent to a second end of the bore, the second collimator being optically aligned with the first collimator,
  the housing and the first and second collimators comprising a fiber optic feedthrough, wherein a polarization extinction ratio of an optical signal traveling from the first optical fiber through the first and second collimators to the second optical fiber is maintained at a value of at least 12 dB, and a hermeticity of the feedthrough across the wall is better than about $10^{-6}$ atm.cc.sec$^{-1}$.

19. The apparatus of claim 18, wherein the vessel is a spacecraft.

20. The apparatus of claim 19, wherein the region of higher pressure gas has a pressure of about one atmosphere, and the region of lower pressure gas has a pressure corresponding to a vacuum of outer space.

21. An apparatus comprising:
  a vessel comprising a wall capable of separating a first volume comprising a first fluid at a first pressure and a second volume comprising a second fluid at a second pressure, wherein the first pressure is greater than the second pressure;
  a housing defining a hollow bore, the housing being adapted to fit hermetically into an aperture defined by the wall;
  a first collimator configured to receive an output from a first optical fiber located in the first volume, the first collimator sealed within a portion of the bore adjacent to a first end of the bore; and
  a second collimator configured to provide an input to a second optical fiber located in the second volume, the second collimator sealed within a portion of the bore adjacent to a second end of the bore, the second collimator being optically aligned with the first collimator,
  the housing and the first and second collimators comprising a fiber optic feedthrough, wherein a polarization extinction ratio of an optical signal traveling between the first volume and the second volume through the fiber optic feedthrough is maintained at a value of at least 12 dB.

22. The apparatus of claim 21, further comprising a window hermetically sealed within the bore between the first and second collimators, wherein at least one of the first and second collimators can be removed from the bore without causing a flow of fluid from the first volume into the second volume.

23. The apparatus of claim 21, wherein the vessel is a submarine, and the first fluid comprises water.

24. The apparatus of claim 23, wherein the second fluid comprises air, the second pressure is about one atmosphere, and a hermeticity of the feedthrough across the wall is better than about $10^{-6}$ atm.cc.sec$^{-1}$.

25. The apparatus of claim 23, wherein the vessel is a pressure vessel for use in a chemical plant.

* * * * *